Patented Mar. 1, 1938

2,110,081

UNITED STATES PATENT OFFICE 2,110,081

TEXTILE PRINTING

Richard Frank Goldstein and Simon Thomson McQueen, Blackley, England, and David Alexander Whyte Fairweather, Grangemouth, Scotland, assignors to Imperial Chemical Industries Limited, a corporation of Great Britain No Drawing. Application May 4, 1936, Serial No. 77,884. In Great Britain May 8, 1935

7 Claims. (Cl. 8—5)

This invention relates to printing textile materials with dyestuffs, more particularly with vat dyestuffs, and to new and useful dyestuff compositions.

It is an object of the invention to provide a new and improved method for printing textile material composed of fibers of vegetable or animal origin, e. g., cotton, regenerated cellulose, acetyl cellulose, wool or silk, with vat dyestuffs, particularly of the indigoid and thioindigoid class. A further object is to provide new and improved compositions especially suitable for this purpose. Other objects will appear hereinafter.

According to the invention we add water-soluble salts of anthraquinone sulfuric esters and/or sulphamic acids to printing pastes containing vat dyestuffs, particularly those of the indigoid or thioindigoid class (or, if preferred, to the dyestuffs themselves previous to incorporation into a printing paste) which facilitate reduction of the dyestuffs and are particularly valuable in that there is secured by their addition a better utilization of dyestuff. Thus, from printing pastes, for instance, such as are described in the examples, one of which contains and the other does not contain an assistant according to the invention, but which are otherwise similar, the former will produce a print of greater depth of color and frequently of improved shade as compared with the latter. Furthermore, the addition of these agents enables less reducing agent to be employed than would otherwise be the case.

As examples of the water-soluble assistants employed may be mentioned soluble salts of beta-hydroxyanthraquinone sulfuric esters and of anthraquinone beta-sulphamic acids. They may be incorporated at any stage in the production of the printing paste or added to the commercial color paste or powder with or without other auxiliary agents, e. g., glycerin or the sodium salt of the condensation product of formaldehyde and a sulfonated naphthalene.

The foregoing assistants may be obtained by treating the appropriate beta-hydroxyanthraquinone or aminoanthraquinone, for instance, 2-hydroxyanthraquinone, 2:6- or 2:7-dihydroxyanthraquinone, 2-aminoanthraquinone or 2:6- or 2:7-diaminoanthraquinone with pyridine-sulfur trioxide or pyridine-chlorosulfonic acid.

In addition to the defined sulfuric esters and sulphamic acids, we can also use substitution products, e. g., their halogen (chloro, bromo, etc.) and alkyl (methyl, ethyl and higher homologues) derivatives and the reduction products thereof still containing oxygen in the ms- (meso-) position or a mixture of any of these. The free esters and acids may be used because they are capable of being converted into soluble salts by other auxiliary agents (e. g., alkali metal carbonates).

The following examples, in which the quantities are stated in parts by weight, illustrate but do not limit the invention.

Example I

A printing paste is made up of

| | Parts |
|---|---|
| 10% aqueous paste of 6:6'-diethoxy thioindigo | 100 |
| Water | 100 |
| British gum thickening | 570 |
| Glycerin | 50 |
| Formosul (sodium formaldehyde sulfoxylate | 80 |
| Potassium carbonate | 100 |
| | 1,000 | and to this paste are added 0.6 part of the sodium salt of the sulfuric ester of 2-hydroxyanthraquinone as a concentrated aqueous paste. After printing and drying, the goods are steamed for three to five minutes in the Mather-Platt apparatus, rinsed, oxidized, rinsed and soaped. The printing paste fixes better and the print is of greater color strength than is the case with a print produced in like manner but without the assistance of the sulfuric ester of 2-hydroxyanthraquinone. Similar results are obtained using the sodium salt of anthraquinone-2-sulphamic acid or of anthraquinone-2:6-disulphamic acid. The sulfuric ester or sulphamic acid can be incorporated at any stage in the production of the printing paste.

Example II

A printing paste is made up of

| | Parts |
|---|---|
| 36% aqueous paste of 5:7:5':7'-tetrabromindigo prepared by ball milling the dyestuff with water and 3% of a 10% paste of sodium cellulose glycolate | 40 |
| Water | 160 |
| British gum thickening | 570 |
| Glycerin | 50 |
| Sodium formaldehyde sulfoxylate | 80 |
| Potassium carbonate | 100 |
| | 1,000 |

To this paste 0.8 part of the sodium salt of the sulfuric ester of 2-hydroxyanthraquinone are added as a concentrated paste. Application and subsequent procedure are as in Example I.

Example III

A printing paste is made up of

| | Parts |
|---|---|
| 13% aqueous paste of 6:6'-dichloro-4:4'-dimethyl thioindigo | 100 |
| Water | 100 |
| British gum thickening | 570 |
| Glycerin | 50 |
| Sodium formaldehyde sulfoxylate | 80 |
| Potassium carbonate | 100 |
| | 1000 | and to 1000 parts of this paste are added 0.6 part of the sodium salt of the sulfuric ester of 2-hydroxyanthraquinone as a concentrated aqueous paste. Application and subsequent procedure are as in Example I. Similar results are obtained using the sodium salt of anthraquinone-2-sulphamic acid or of 2:6-disulphamic acid.

Other vat dyestuffs may be used instead of those given in the examples. As further examples may be mentioned indole indolindigos, e. g., 4:4'-dichloro-5:5'-dibromo indigo, 5:5'-dichloro-7:7'-dibromo indigo, bromo-2-beta-naphthindol-2-indolindigo, bis-alpha-naphthindolindigo, bis-beta-naphthindol indigo; thioindigos, e. g., 6:6'-dichloro-thioindigo, 6:6'-dimethoxy thioindigo, 6:6'-difluoro-thioindigo, 5:5'-dichloro-7:7'-dimethyl thioindigo, 5:5'-dibromo-7:7'-dimethyl thioindigo, 4:4'-dimethyl thioindigo, bis-beta-naphthionaphthene indigo, 5:5'-dichloro-6:6'-dimethyl thioindigo, 4:7:4':7'-tetramethyl-5:5'-dichloro-thioindigo; thionaphthene indolindigos, e. g., 2-(5:7-dibromindol)-2'-4:7-dimethyl thionaphthene indigo, 2-(5:7-dibromindol)-2'-6-chlor-7-methyl thionaphthene indigo, 2-(5:7-dibromindol)-2'-4:5:6:7-tetramethyl thionaphthene indigo; 2-(5:7-dibromindol)-2'-4:7-dimethyl-5-chloro-thionaphthene indigo; acenaphthene thionaphthene indigos, e. g., acenaphthene-4-chlor-7-methyl thionaphthene indigo, thionaphthene acenaphthene indigo; 2:3:2':3'-dianthraquinone indigo, dimethyl indirubin, dibromindirubin, water-insoluble reduction products of any of the aforesaid dyes, or related dyes. The invention is also applicable to sulfur dyes.

The term "vat dyestuff" is used to define dyes which are insoluble in water but which can be converted by heating with reducing agents and alkalis into soluble leuco compounds. The term "indigoid" is used generically as employed by Truttwin "Enzyklopädie der Küpenfarbstoffe" (1920).

In place of a part or all of the glycerin, another polyhydric alcohol may be used, e. g., diethylene glycol. Likewise, the reducing agents, alkalis, and other auxiliary agents may be varied, e. g., by utilizing glucose, preservers syrup in place of sodium formaldehyde sulfoxylate, and other alkali metal carbonates in place of potassium carbonate.

Other soluble salts of the anthraquinone sulfuric esters or sulphamic acids, e. g., the potassium salt, or ammonium salt may be used.

As many apparently widely different embodiments of this invention may be made without departing from the spirit and scope thereof, it is to be understood that we do not limit ourselves to the specific embodiments thereof except as defined in the appended claims.

We claim:

1. A vat dyestuff preparation suitable for use in printing textile fibers comprising a vat dyestuff, a compound selected from the class consisting of anthraquinone sulphamic acids, water-soluble salts thereof, and such reduction products as contain oxygen in the meso-position.

2. A vat dye preparation comprising an indigoid dyestuff and a compound selected from the class consisting of anthraquinone sulphamic acids, water-soluble salts thereof, and such reduction products as contain oxygen in the meso-position.

3. A vat dye preparation comprising an indigoid dyestuff and a soluble salt of an anthraquinone-beta-sulphamic acid.

4. The process which comprises printing textile materials with an indigoid vat dyestuff printing paste containing a vat dyestuff and a soluble salt of a compound from the class consisting of anthraquinone sulphamic acids and such reduction products thereof as contain oxygen in the meso-position.

5. The process which comprises printing textile materials with a vat dyestuff printing paste comprising a vat dyestuff and an alkali metal salt of an anthraquinone-beta-sulphamic acid.

6. The process which comprises printing on textile materials with a vat dyestuff printing paste comprising 6:6'-diethoxy thioindigo and an alkali metal salt of an anthraquinone-beta-sulphamic acid.

7. A process which comprises printing textile materials with a printing paste containing a vat dyestuff, a compound selected from the class consisting of anthraquinone sulphamic acids, water soluble salts thereof, and such reduction products as contain oxygen in the meso-position.

RICHARD FRANK GOLDSTEIN.
SIMON THOMSON McQUEEN.
DAVID ALEXANDER WHYTE
FAIRWEATHER.